US009823158B2

(12) United States Patent
Komninos et al.

(10) Patent No.: US 9,823,158 B2
(45) Date of Patent: Nov. 21, 2017

(54) MULTI-FUNCTION ULTRASONIC SOUND GENERATOR WITH AN AUDIO TRANSDUCER FOR HUMAN HEARING

(71) Applicant: Radiaulics, Inc., Lone Tree, CO (US)

(72) Inventors: Nikolaos I. Komninos, Lone Tree, CO (US); Arthur Ray Hughes, Parker, CO (US)

(73) Assignee: Radiaulics, Inc., Littleton, CO (US)

( * ) Notice: Subject to any disclaimer, the term of this patent is extended or adjusted under 35 U.S.C. 154(b) by 38 days.

(21) Appl. No.: 14/589,621

(22) Filed: Jan. 5, 2015

(65) Prior Publication Data

US 2015/0198500 A1    Jul. 16, 2015

Related U.S. Application Data

(60) Provisional application No. 61/928,108, filed on Jan. 16, 2014.

(51) Int. Cl.
| H04R 29/00 | (2006.01) |
| G01M 3/24 | (2006.01) |
| H03G 3/20 | (2006.01) |

(52) U.S. Cl.
CPC .............. *G01M 3/24* (2013.01); *H04R 29/00* (2013.01)

(58) Field of Classification Search
CPC ................................. G01M 3/24; H04R 29/00
USPC ..... 381/56, 58, 301, 302, 57; 73/40, 40.5 A, 73/592
See application file for complete search history.

(56) References Cited

U.S. PATENT DOCUMENTS

| 3,782,180 | A | 1/1974 | Harris |
| 4,416,145 | A | 11/1983 | Goodman et al. |
| 5,432,755 | A * | 7/1995 | Komninos ............... G01H 3/12 367/135 |
| 5,955,670 | A | 9/1999 | Goodman et al. |
| 6,058,076 | A | 5/2000 | Komninos |
| 6,079,275 | A | 6/2000 | Komninos |
| 6,163,504 | A | 12/2000 | Komninos et al. |
| 6,430,988 | B1 * | 8/2002 | Watanabe ............... G01M 3/24 73/40.5 A |
| 6,923,063 | B2 | 8/2005 | Komninos |
| 7,051,577 | B2 | 5/2006 | Komninos |
| 8,245,576 | B2 | 8/2012 | Komninos |

(Continued)

FOREIGN PATENT DOCUMENTS

| CN | 103380359 A | 10/2013 |
| EP | 0 303 776 B1 | 12/1992 |

*Primary Examiner* — Vivian Chin
*Assistant Examiner* — Ammar Hamid
(74) *Attorney, Agent, or Firm* — Dorr, Carson & Birney PC

(57) ABSTRACT

A system for ultrasonic leak detection employs a number of ultrasonic signal generators, each of which include an ultrasonic transducer generating an ultrasonic signal and an audio transducer generating an audio signal in the frequency range of human hearing that is a replica of the ultrasonic waveform. The ultrasonic signal generators are activated and placed at selected locations within the enclosure to be tested. The operator can listen for the audio signal to verify operation and the output waveform type of the ultrasonic signal generators. A mobile ultrasonic leak detector can then be employed outside the enclosure to detect any leakage of the ultrasonic signal through the enclosure wall to identify any leak paths.

7 Claims, 5 Drawing Sheets

(56) References Cited

U.S. PATENT DOCUMENTS

2004/0123648 A1\* 7/2004 Stumpf ............... G01M 17/007
 73/40.5 A
2006/0006761 A1\* 1/2006 Goodson ................... B08B 3/12
 310/317

\* cited by examiner

Continuous Wave (CW)

Burst Wave

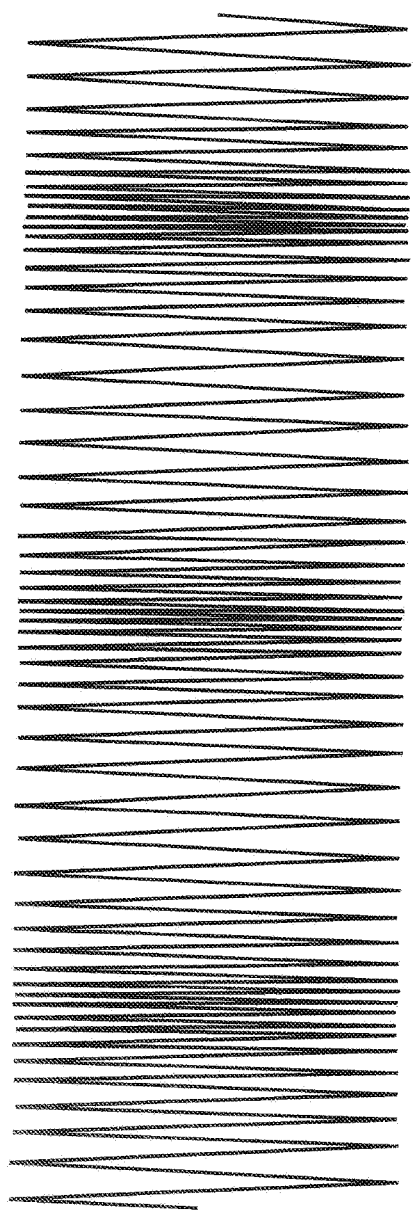
Fig. 4c  Sweep
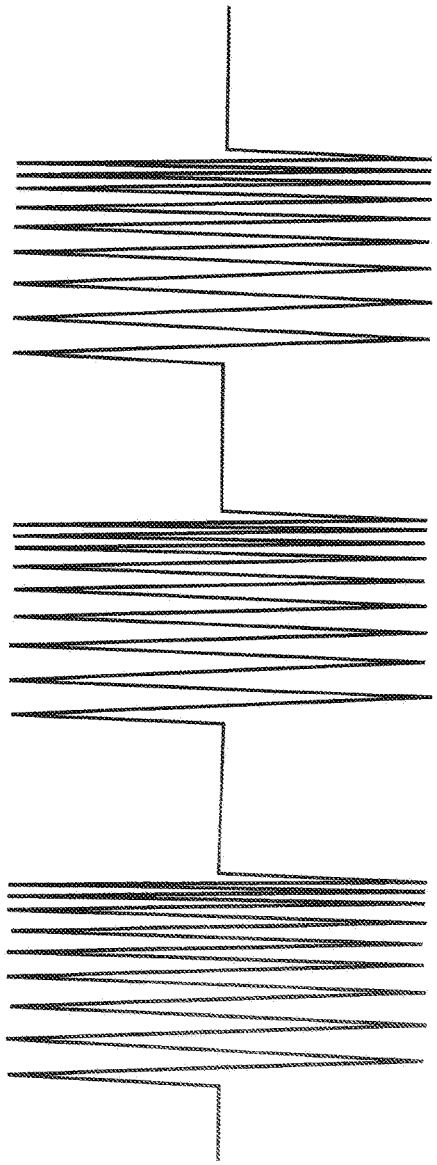
Fig. 4d  Chirp

MULTI-FUNCTION ULTRASONIC SOUND GENERATOR WITH AN AUDIO TRANSDUCER FOR HUMAN HEARING

RELATED APPLICATION

The present application is based on and claims priority to the Applicants' U.S. Provisional Patent Application 61/928,108, entitled "Multi-Function Ultrasonic Sound Generator With An Audio Transducer For Human Hearing," filed on Jan. 16, 2014.

BACKGROUND OF THE INVENTION

Field of the Invention

The present invention relates generally to the field of ultrasonic sound generators. More specifically, the present invention discloses a multi-function ultrasonic sound generator with an audio transducer that enables a human operator to hear a frequency-shifted version of the ultrasonic signal.

Statement of the Problem

Ultrasonic sound generators (USGs) producing airborne ultrasound are used for artificially pressurizing with sound waves volumes such as tanks, rooms, automobiles, cabins and enclosures that cannot be pressurized with compressed air or other means for leak testing. One conventional method of use is to place the USG in a room (tank or enclosure), seal it, and from the outside using an ultrasonic leak detector (ULD) try to find where sound is coming through the wall or the seals of the enclosure. The points where this sound is detected are leak points.

Currently some manufacturers offer models that produce a constant sound wave (CW) which when detected by an ultrasonic leak detector or translator sounds like a constant pitch tone. Others produce devices that generate two waveforms, a CW or a burst wave, which is a rhythmic on-and-off cycling of the CW wave. Yet others make simple sweeps that repeat or sweeps that the sound increases in pitch up to a maximum then decreases to a minimum and repeats. With the exception of one device on the market that offers CW and burst wave selectable by the user, all others are either only CW or only sweep.

Conventional USG devices are inaudible when operating and, depending on their sophistication, communicate with the operator via lights (if they are so equipped) to indicate which mode they are in. However since the sound produced by the USG is inaudible, it is typically necessary to use an ULD to verify that the USG is actually producing an ultrasonic signal.

Also, it can be difficult to find an USG that has been placed in a large dark enclosure after the completion of a leak detection job without the use of a ULD, especially if the USG has fallen from its initial position. This is another area in which an audible signal from the USG would be helpful.

Finally, large enclosures such as the hull of a bulk carrier or commercial ship often cannot be adequately covered with one USG, and therefore require multiple USGs placed in different regions within the enclosure. The operation of multiple USGs can cause standing waves especially in symmetrical spaces, which can result in constructive or destructive interference if the devices are tuned to the same frequency. Here also, a need exists for means to enable the operator to verify proper operation and placement of multiple USGs within a large enclosure.

Solution to the Problem

The present invention addresses these shortcomings in the prior art by providing an ultrasonic sound generator that generates both an ultrasonic signal and an audio signal that is replica of the ultrasonic waveform. This enables the operator to verify proper operation and placement of the USG simply by listening to the audio signal before proceeding with ultrasonic leak detection outside the enclosure with an ULD.

SUMMARY OF THE INVENTION

This invention provides a system for ultrasonic leak detection that employs a number of ultrasonic signal generators, each of which include an ultrasonic transducer generating an ultrasonic signal and an audio transducer generating an audio signal in the frequency range of human hearing that is a replica of the ultrasonic waveform. The ultrasonic signal generators are activated and placed at selected locations within the enclosure to be tested. The operator can listen for the audio signal to verify operation and the waveform output of the ultrasonic signal generators. A mobile ultrasonic leak detector can then be employed outside the enclosure to detect any leakage of the ultrasonic signal through the enclosure wall to identify any leak paths.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which:

FIGS. 4a-4d show examples of various ultrasonic signal waveforms that can be selected as outputs for the ultrasonic sound generator 10.

DETAILED DESCRIPTION OF THE INVENTION

Figure 1:
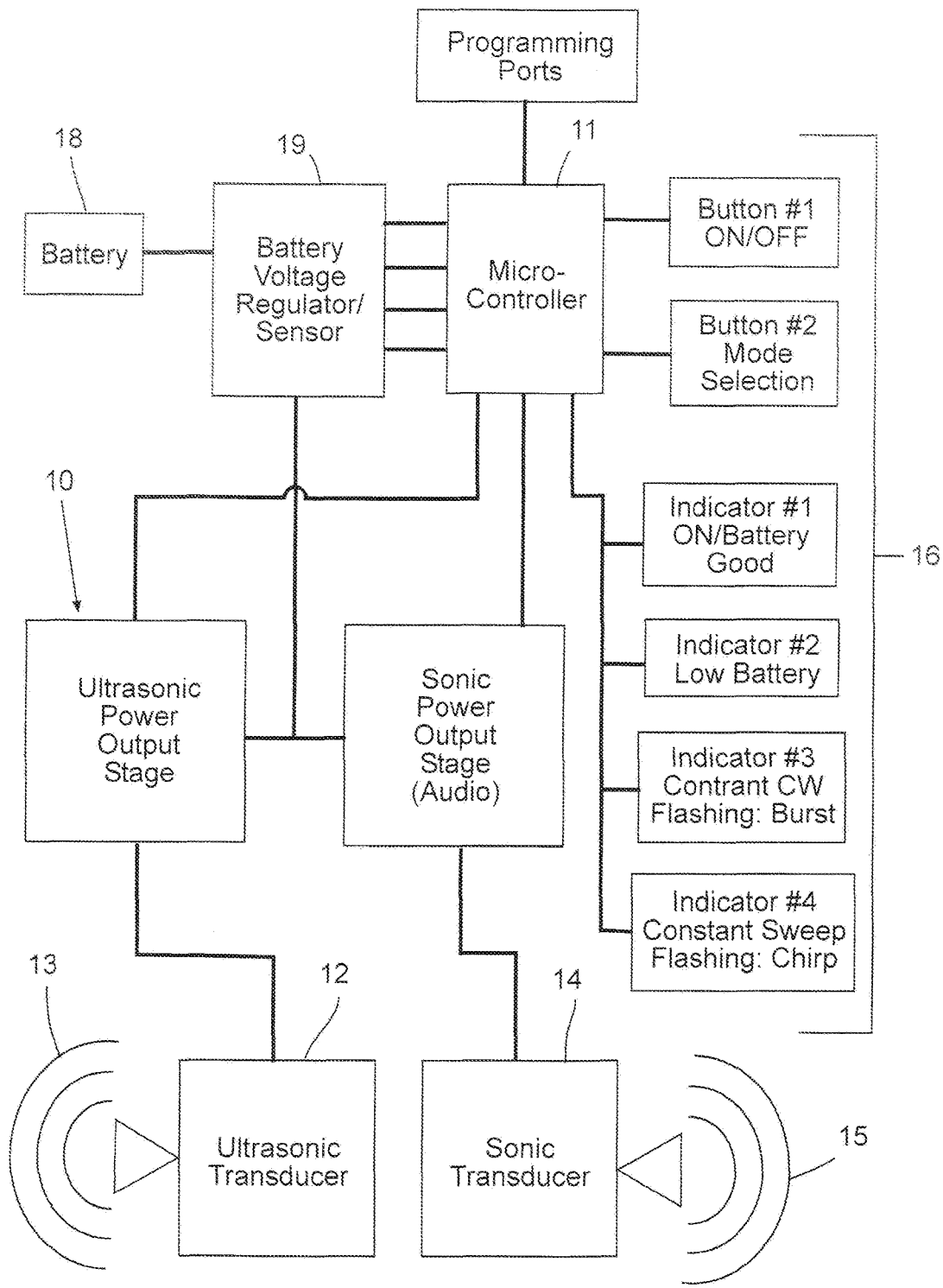
FIG. 1 is a schematic block diagram of an ultrasonic sound generator (USG) 10 embodying the present invention.

A block diagram of an ultrasonic sound generator (USG) 20 embodying the present invention is shown in FIG. 1. The present invention uses a processor 11 (e.g., microcontroller) that generates multiple waveforms via software and drives an ultrasonic transducer 12 and an audio transducer 14 to generate two output signals: one ultrasonic and the other sonic (or audible). The audible signal 15 mimics the waveform of the ultrasonic signal 13 and is output to an audio speaker or audio transducer 14. For example, the audio output signal 15 can be a mapped replica of the ultrasonic signal 13 waveform that has been transformed or translated into the frequency range for human hearing. The audio sound 15 produced is similar to the audible output signal produced by a conventional ultrasonic leak detector (ULD) depending on how the ULD transforms or translates the ultrasonic signal into the audible frequency range for human hearing.

For example, the audio signal 15 can be a replica of the ultrasonic signal 13 that has been frequency-shifted by a fixed amount in the frequency domain to translate the ultrasonic signal 13 into the audible frequency range. In this embodiment, if the ultrasonic waveform of the USG 10 is a constant 40 kHz wave and the ULD's local oscillator is tuned to 38 kHz, the difference is 2 kHz and this is the audible frequency that the ULD will produce and the operator will hear. Similarly, if the ultrasonic generator waveform is a 40 kHz burst with a repetition rate of 1 Hz, the audio signal output will be a series of 2 kHz bursts with a repetition rate of 1 Hz.

It should be noted that other types of frequency-shifting or translation could be employed. For example, frequency division can also be used to reduce the frequency of the ultrasonic signal 13 into the audible range. In this embodiment, if the USG 10 generates an ultrasonic chirp (burst of a frequency sweep), the audio signal 15 will be a chirp of a fixed reduction ratio of the frequency content of the sweep. If the ratio is 20:1, a 40 kHz ultrasonic signal will be reduced to 2 kHz.

In other words, the present invention generates an audio sound 15 at the ultrasonic sound generator 10 to mimic the sound a ULD would produce after translating or frequency-shifting the detected ultrasonic wave into the audible range for human hearing. The USG operator can select a variety of waveforms via an appropriate user interface 16, and can select if he wants to hear what the generator produces. Furthermore, the ultrasonic sound generator 10 is capable of generating a range of ultrasonic signal intensities, and the operator can select a desired intensity via the user interface 16. For example, the user interface 16 can be a touch screen offering a number of waveform options, or a selector switch to allow the operator to select a desired waveform. The embodiment shown in FIG. 1 uses an on/off button, a "mode selection" button and an array of indicator lights as the user interface 16. The ability to hear the USG 10 offers many advantages such as confirmation that the USG 10 is on and knowledge of what is expected to be heard with the ULD 20 during testing. Additionally, it helps the user find and retrieve the USG 10 within a large space using his ears without the need to use an ULD 20.

In the preferred embodiment of the present invention, the USG 10 is based on a processor 11 (or microcontroller) that drives both the ultrasonic transducer 12 and audio transducer 14. This architecture allows great flexibility in selecting signal waveforms, since the processor 11 can be used to generate virtually any software-defined ultrasonic and sonic (audio) waveform alone or simultaneously, such as carrier waves (CW or single tone), burst tones, ascending or descending frequency (triangle) sweeps, saw tooth sweeps, chirps, double chirps, ascending or descending chirp-sweeps, linear or nonlinear sweeps and other arbitrary waveforms. The ultrasonic waveform and the corresponding sonic replica can be time-synchronized or randomly linked between them. Several such examples of ultrasonic signal waveforms 13 are illustrated in FIGS. 4a-4d.

As shown in FIG. 1, the processor 11 can be powered by a conventional battery 18 via battery voltage regulation circuitry 19. This can include reverse polarity protection, and a battery voltage sensor to warn the user if the battery needs to be replaced or recharged.

Figure 2:
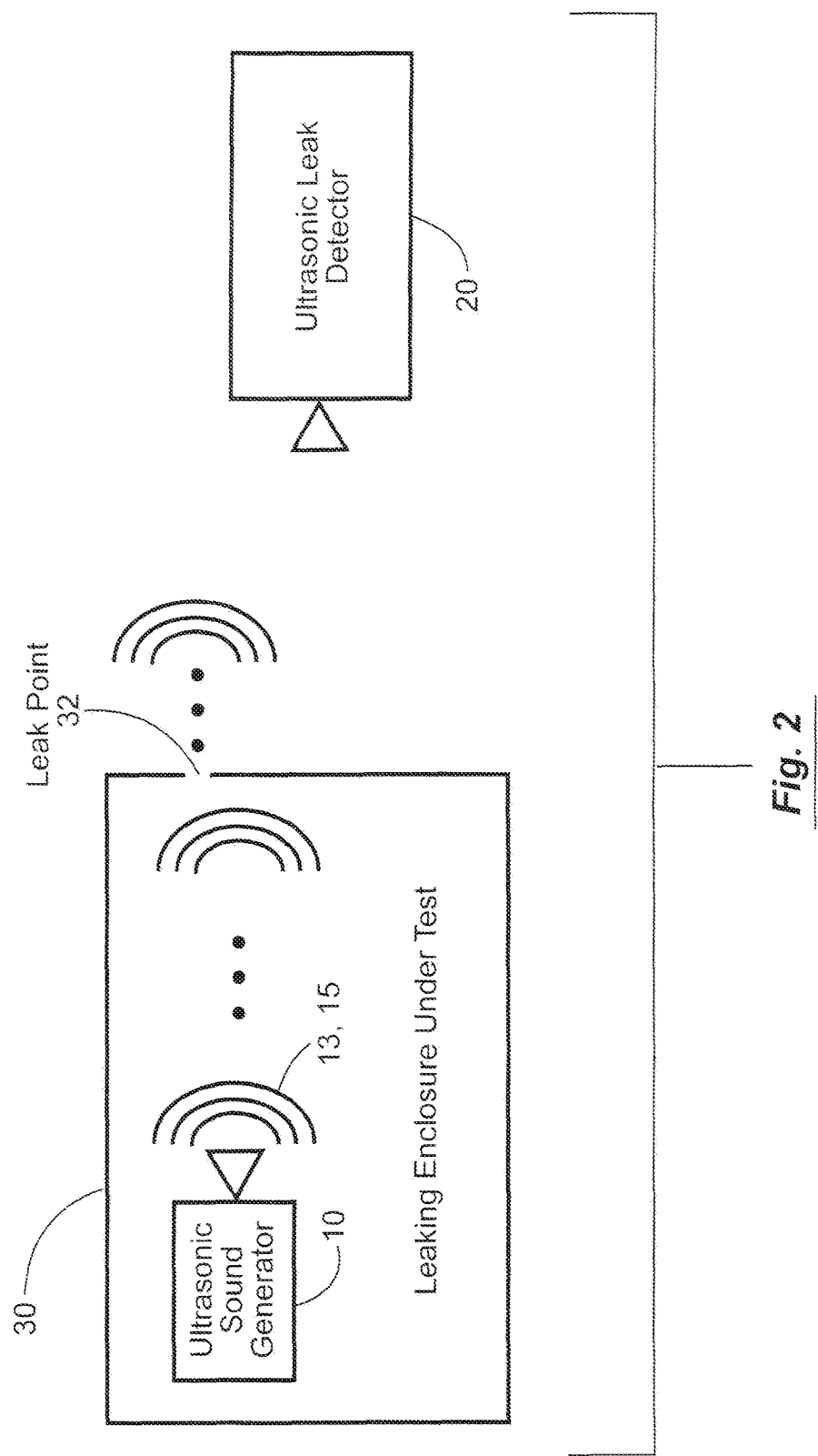
FIG. 2 is a diagram illustrating use of the ultrasonic sound generator 10 and an ultrasonic leak detector (ULD) 20 to detect a leak 32 through the wall of an enclosure 30.

FIG. 2 is a diagram illustrating use of an USG 10 and an ultrasonic leak detector (ULD) 20 to detect a leak 32 through the wall of an enclosure 30. The USG 10 is initially placed within the enclosure 30 and activated. The operator can employ the user interface 16 to select a desired ultrasonic waveform 13 and intensity. The replica audio waveform 15 produced by the USG 10 offers confirmation that the device is properly functioning, and that the desired waveform has been selected. The ultrasonic signal 13 from the USG 10 propagates throughout the interior of the enclosure 30 and escapes through any leak paths 32 in the enclosure wall. The operator can use an ULD 20 outside the enclosure 30 to identify and localize these leak points 32 by searching and maximizing the strength of the ultrasonic signal 13 detected by the ULD 20.

Figure 3:
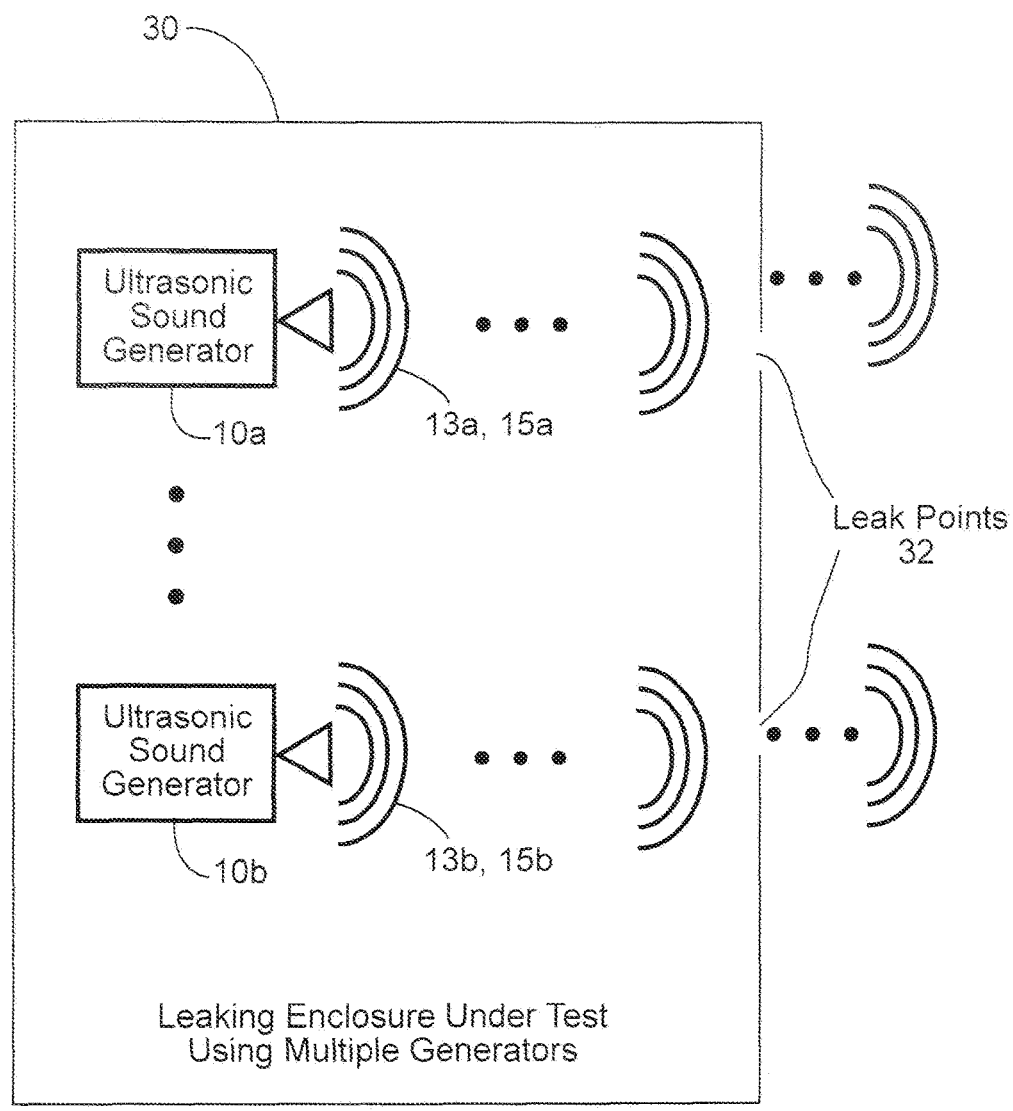
FIG. 3 is a diagram illustrating use of multiple ultrasonic sound generators 10a, 10b with distinctive signal waveforms to detect a leak 32 in an enclosure 30.
Figure 4A:
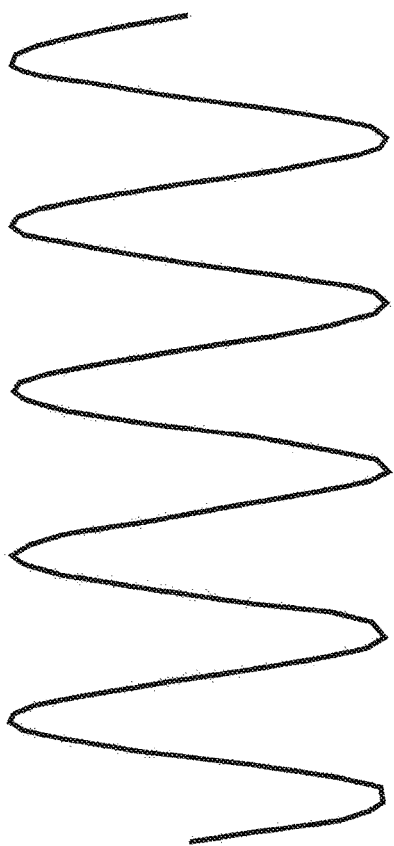
Figure 4B:
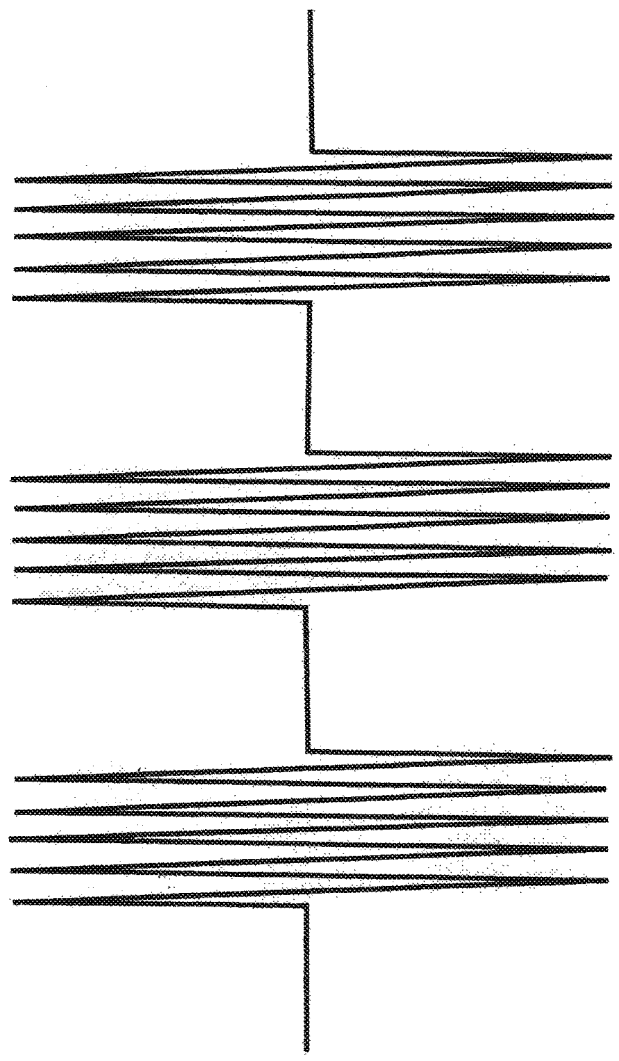

Placing multiple USGs 10a, 10b within an enclosure 30, as shown in FIG. 3, increases the resulting sound pressure and the possibility of detecting a leak 32. Having the ability to place multiple USGs 10a, 10b with different, distinctive waveforms helps the operator of the ultrasonic leak detector 20 by providing information as to where the leak path is. For example, a first USG 10a generating a burst-tone ultrasonic signal 13a and replica audio signal 15a can be placed in a first region of the enclosure under test, and a second USG 10b generating a sweep ultrasonic signal 13b and replica audio signal 15b can be placed in a second region of the enclosure. If the operator of the ULD 20 hears a burst versus a sweep, the operator will know merely by listening that the leak 32 is located closer to the USG 10a that generates bursts and thus, will be able to localize the area to search for the leak 32 with the ULD 20.

The present instrument can be used with a tripod for support. For example, placing an USG 10 in a refrigerated super-market show case may be a problem if the location and orientation of the ultrasound producing transducer is not easily aligned with the door or other test point within the show case. The present instrument can be equipped with a threaded insert (e.g., on the bottom of instrument) to enable the USG 10 to be removably secured onto a tripod (rigid or flexible) and placed anywhere the tripod can be supported. In this manner, multiple USGs producing distinctive sound patterns can be placed in multiple show cases to test their door seals. Again, this configuration of multiple USGs maximizes the sound pressure within the enclosure and makes it easier to localize any leaks by distinguishing the audio waveform.

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims.

We claim:

1. A method for ultrasonic leak detection in an enclosure, said method comprising: providing an ultrasonic signal generator comprising: a processor, an ultrasonic transducer driven by the processor for generating an ultrasonic signal having a predetermined waveform; and an audio transducer driven by the processor for generating an audio signal in the frequency range of human hearing that is a replica of the waveform of the ultrasonic signal; activating and placing the ultrasonic signal generator at a selected location within the enclosure; listening for the audio signal of the ultrasonic signal generator to verify operation and the waveform output of the ultrasonic signal generator; providing a mobile ultrasonic leak detector outside the enclosure, said ultrasonic leak detector producing an indication if the ultrasonic signal of the ultrasonic signal generator is detected; and detecting any leakage of the ultrasonic signal through the enclosure with the ultrasonic leak detector, to thereby identify any leak paths through the enclosure.

2. The method of claim 1 further comprising providing multiple ultrasonic signal generators with distinctive waveforms in different regions of the enclosure, and wherein detection of the distinctive waveforms is used to localize scanning with the ultrasonic leak detector to identify any leak paths through the enclosure.

3. The method of claim 1 further comprising the step of listening for the audio signal to assist in finding the ultrasonic signal generator within the enclosure after testing has been completed.

4. The method of claim 1 wherein the ultrasonic signal generator is capable of generating any of a plurality of waveforms selectable by a user.

5. The method of claim 1 wherein the ultrasonic signal generator is capable of generating a range of ultrasonic signal intensities selectable by a user.

6. An ultrasonic sound generator comprising: a processor; a user interface in communication with the processor allowing a user to select a desired ultrasonic waveform from a plurality of predetermined waveforms; an ultrasonic transducer driven by the processor to generate a ultrasonic signal having the selected waveform; and an audio transducer driven by the processor to generate an audio signal in the frequency range of human hearing that is a replica of the waveform of the ultrasonic signal, to thereby provide audible verification of the waveform of the ultrasonic signal output by the ultrasonic signal generator.

7. The ultrasonic sound generator of claim 6 wherein the audio signal is a replica of the ultrasonic signal generated by software.

* * * * *